US009580838B2

(12) United States Patent
Saul et al.

(10) Patent No.: US 9,580,838 B2
(45) Date of Patent: Feb. 28, 2017

(54) PROCESS FOR PRODUCING POLYMERIC STRUCTURES THAT HAVE ACTIVATED SURFACES AND ACTIVATED POLYMERIC STRUCTURES

(71) Applicants: Fundacao Oswaldo Cruz, Rio de Janeiro (BR); Universidade Federal do Parana-UFPR, Curitiba (BR); Instituto de Biologia Molecular do Parana-IBMP, Curitiba (BR); Universidade Federal do Rio Grande do Sul-UFRGS, Porto Alegre (BR)

(72) Inventors: Cyro Ketzer Saul, Curitiba (BR); Elis Moura Stori, Porto Alegre (BR); Cesar Liberato Petzhold, Porto Alegre (BR); Wido H. Schreiner, Curitiba (BR); Marco Aurelio Krieger, Curitiba (BR); Leonardo Foti, Curitiba (BR); Andre Sionek, Curitiba (BR); Paula Poli Soares, Alvorada (BR)

(73) Assignees: Fundacao Oswaldo Cruz, Rio de Janeiro (BR); Universidade Federal do Parana-UFPR, Curitiba (BR); Instituto de Biologia Molecular do Parana-IBMP, Curitiba (BR); Universidade Federal do Rio Grande do Sul-UFRGS, Porto Alegre (BR)

( * ) Notice: Subject to any disclaimer, the term of this patent is extended or adjusted under 35 U.S.C. 154(b) by 0 days.

(21) Appl. No.: 14/351,552

(22) PCT Filed: Oct. 10, 2012

(86) PCT No.: PCT/BR2012/000386
§ 371 (c)(1),
(2) Date: Apr. 11, 2014

(87) PCT Pub. No.: WO2013/053030
PCT Pub. Date: Apr. 18, 2013

(65) Prior Publication Data
US 2014/0246812 A1    Sep. 4, 2014

(30) Foreign Application Priority Data
Oct. 11, 2011    (BR) ..................................... 1106844

(51) Int. Cl.
*D01D 7/00* (2006.01)
*D01D 5/00* (2006.01)
(Continued)

(52) U.S. Cl.
CPC ............... *D01D 5/003* (2013.01); *B29B 9/06* (2013.01); *B29B 9/12* (2013.01); *D01D 5/0046* (2013.01);
(Continued)

(58) Field of Classification Search
CPC .... D01D 5/0007; D01D 5/0015; D01D 5/003; D01D 5/0046; D01D 5/0076; D01D 5/06; D01D 7/00
(Continued)

(56) References Cited

U.S. PATENT DOCUMENTS

| 692,631 A | 2/1902 | Cooley |
| 705,691 A | 7/1902 | Morton |

(Continued)

FOREIGN PATENT DOCUMENTS

| CN | 102240251 A | 11/2011 |
| KR | 100746643 B1 | 7/2007 |

OTHER PUBLICATIONS

English language abstract for CN 102240251 A (2011).
(Continued)

*Primary Examiner* — Leo B Tentoni
(74) *Attorney, Agent, or Firm* — Caesar Rivise, PC

(57) ABSTRACT

The present invention relates to a process for producing polymeric structures that have activated surfaces. The process proved to be simple, quick, with high production capacity and low operating costs. The process occurs by depositing a polymer solution, which is assisted by a high electric field, on a conductive liquid surface to produce particles and/or filaments that have an activated surface. More particularly, the process of the present invention has the ability to produce particles and/or filaments that have chemically activated surfaces, in a single process.

22 Claims, 5 Drawing Sheets

(51) Int. Cl.
    *B29B 9/06*   (2006.01)
    *B29B 9/12*   (2006.01)
    *D01F 1/10*   (2006.01)
    *D01F 6/16*   (2006.01)
    *D01F 6/22*   (2006.01)

(52) U.S. Cl.
    CPC ............ *D01D 5/0076* (2013.01); *D01F 1/10* (2013.01); *D01F 6/16* (2013.01); *D01F 6/22* (2013.01)

(58) Field of Classification Search
    USPC .......... 264/10, 165, 298, 464, 465, 466, 484
    See application file for complete search history.

(56) References Cited

U.S. PATENT DOCUMENTS

| | | | |
|---|---|---|---|
| 1,975,504 | A | 10/1934 | Formhals |
| 2003/0168756 | A1 | 9/2003 | Balkus, Jr. et al. |
| 2005/0253305 | A1* | 11/2005 | Kim et al. .................. 264/465 |
| 2007/0035055 | A1* | 2/2007 | Gee et al. ................ 264/465 X |
| 2009/0035381 | A1 | 2/2009 | Stankus et al. |
| 2009/0081457 | A1 | 3/2009 | Nagarajan et al. |
| 2011/0180972 | A1* | 7/2011 | Lee et al. ..................... 264/465 |

OTHER PUBLICATIONS

CHU et al. "Plasma-surface modification of biomaterials." Materials Science and Engineering: R: Reports 36.5 (2002): 143-206.
Kato et al. "Polymer surface with graft chains." Progress in Polymer Science 28.2 (2003): 209-259.
Kondyurin et al. "Attachment of horseradish peroxidase to polytetrafluorethylene (teflon) after plasma immersion ion implantation." Acta biomaterialia 4.5 (2008): 1218-1225.
Mesyats et al. "Adhesion of polytetrafluorethylene modified by an ion beam." Vacuum 52.3 (1999): 285-289.
Rayleigh. "XX. On the equilibrium of liquid conducting masses charged with electricity." The London, Edinburgh, and Dublin Philosophical Magazine and Journal of Science 14.87 (1882): 184-186.
Salata, Oleg V. "Tools of nanotechnology: electrospray." Current nanoscience 1.1 (2005): 25-33.
Stori, Elis Moura. "Estudo morfólogico de micro-particulas de poliestireno produzidas por eletrospray para uso em sistemas de diagnóstico". Engineering and Materials Science, Graduate Program in Engineering and Materials Science—PIPE. Technology Sector, Federal University of Paraná (2010): 1-58.
Taylor, Geoffrey. "Disintegration of water drops in an electric field." Proceedings of the Royal Society of London A: Mathematical, Physical and Engineering Sciences. vol. 280. No. 1382. The Royal Society (1964): 383-397.
Wolf, Rory A. "Surface activation systems for optimizing adhesion to polymers." Conference Proceedings of the ANTEC Conference (2004): 1-5.
Zeleny, John "The electrical discharge from liquid points, and a hydrostatic method of measuring the electric intensity at their surfaces." Physical Review 3.2 (1914): 69-91.
International Search Report and Written Opinion for PCT/BR2012/000386 dated Feb. 15, 2013.
Response to International Search Report filed May 7, 2013.
Written Opinion by the Authority in Charge of the Preliminary International Examination dated Sep. 6, 2013.
Response to Written Opinion by the Authority in Charge of the Preliminary International Examination filed Nov. 5, 2013.
International Preliminary Examination Report dated Dec. 26, 2013.

* cited by examiner (a)

(b)

(c)

PROCESS FOR PRODUCING POLYMERIC STRUCTURES THAT HAVE ACTIVATED SURFACES AND ACTIVATED POLYMERIC STRUCTURES

The present invention relates to a process for production of polymeric structures with activated surfaces. More particularly, it relates to a process, which, simultaneously, is able to produce particles and/or filaments with chemically active surfaces. The process takes place from the deposition of a polymer solution, aided by a high electric field in a conducting liquid surface for production of particles or filaments with activated surface. The invention even claims the activated polymeric structures obtained according to the process of the invention.

BACKGROUND OF THE INVENTION

A great number of methods for producing particles and/or filaments are described in the literature. Among these methods electrospray and electrospinning have an important highlight, because they produce particles and fibers, respectively.

Electrospray and electrospinning are technologies that use high electric fields for producing particles and/or fibers. In this process a jet of polymeric solution is accelerated and stretched through an electric field. Depending on the physical properties of the solution, the stretched jet can break, generating droplets, which produce micro/nanoparticles, or remain as a filament that after drying, produces fibers of micro/nanometric diameter (O. V. Salata, Tools of nanotechnology: Electrospray, Current Nanoscience 1: 25-33, 2005; S. Ramakrishna, et al., An Introduction to Electrospinning and Nanofibers, World Scientific Publishing Co., 2005).

Electrospray and electrospinning techniques make possible variations almost unlimited in the composition of ejected solutions, showing to be applicable in several technological sectors and for different applications, according to the needs of usage of particles or filaments.

Particles and filaments can be used in several industry segments, in the engineering of fabrics, ceramic fibers and filters, in the production of biomaterials used in treatment and diagnosis, in pharmaceutical, food, cosmetic industry etc. The particles and filaments also can be used in monitoring the pollutant dispersion, and in the quality of the environment protection processes.

The fundamental concepts of electrospray were launched by Lord Rayleigh, in 1882, when he was studying the instabilities in charged liquids (L. Rayleigh, On the equilibrium of liquid conducting masses charged with electricity, Phil. Mag. 14: 184, 1882). Applications of the technique were patented by J. F. Cooley e W. J. Morton (J. F. Cooley, Apparatus for Electrically Dispersing Fluids, U.S. Pat. No. 692,631, 1902; W. J. Morton, Method of Dispersing Fluids, U.S. Pat. No. 705,691, 1902). The explanation of the phenomenon was provided later by J. Zeleny (J. Zeleny, The electrical discharge from liquid points, and a hydrostatic method of measuring the electric intensity at their surfaces, Phys. Rev. 3:69-91, 1914) in 1914, but the physical principles of capillary formation in charged liquids only were established in 1964 by Taylor (G. I. Taylor, Disintegration of water drops in an electric field, Proceedings of the Royal Society 280: 383-397, 1964).

Regarding the electrospinning, which follows the same physical principles of electrospray, the first patent that described the technique, was registered in 1934 by Formhals (A. Formhals, Process and apparatus for preparing artificial threads, U.S. Pat. No. 1,975,504, 1934), when he was developing an apparatus for producing filaments from the force of electrostatic repulsion among the surface charges. Despite the apparatus for electrospinning is extremely simple, its operating mechanism, similar to the electrospray, is very complicated.

When a high voltage (usually in the range from 1 to 30 kV) is applied, the polymeric solution drop, in the ejector nozzle, becomes highly electrified with the charge uniformly distributed over the surface. As a result, the polymeric solution drop will suffer two types of Coulomb electrostatic forces, the repulsion among the surface charges and the force exerted by the external electric field. Under the action of these electrostatic interactions, the solution drop is distorted to a conic form, known as Taylor cone. Since the force of the electric field has exceeded a threshold value, the electrostatic forces can overcome the surface tension of the polymer solution, and then force the ejection of the solution jet from the ejector nozzle.

During the pathway that the electrified jet goes through, from the ejector nozzle to the collector, the process of stretching and lengthening of the jet takes place, and depending on the physical characteristics of the polymeric solution, the jet can break into drops or remain as a filament. In this pathway the evaporation of the solvent and the polymer solidification also take place, leading to the formation of particles or filaments (O. V. Salata, Tools of nanotechnology: Electrospray, Current Nanoscience 1: 25-33, 2005; S. Ramakrishna, et al., An Introduction to Electrospinning and Nanofibers, World Scientific Publishing Co., 2005).

Practically, all the polymers are susceptible to deposition by electrospray or electrospinning. The limitation is to find a solvent able to dilute or emulsify it in order to produce a solution or emulsion able to pass through the capillary of the pumping system. There are polymers for which there is some difficulty for deposition as a function of their physical or electrical properties, but adjusts of these parameters by means of the use of additives, variation of concentration etc, allow the use of these polymers.

Several polymers have been used industrially, such as Nylon, Polyester, Polyacrylonitrile, polyvynil alcohol, Polyurethane, Polylactic acid etc. Conventionally, the electrospinning technique uses preponderantly a solution of polymers in organic solvents, such as chloroform, formic acid, tetrahydrofuran (THF), dimethylformamide (DMF), acetone and alcoholic solvents.

The need for chemical activation of polymeric surfaces emerged together with the development of the first polymers. Generally, the simpler the polymeric chain, the smaller the reactivity. This generally implies in technical difficulties related mainly to dissolution and adhesion to other materials. The change of the polymers structure by introduction of new radicals in the chains, allowed generating new families of polymers with their own physicochemical properties.

In certain situations, it is necessary to use a polymer with an inert inside, but with reactive external surface in order to allow adhesion to other materials, or even to perform specific chemical reactions. Based on this need, from the beginning of the nineties, several techniques based on physical or chemical phenomena were developed, searching the superficial activation of polymeric materials. Among the several physical techniques employed, it is highlighted the electrostatic discharges at atmospheric pressure, the low energy ion implantation, and the low temperature plasma discharge in a reduced pressure environment.

The electrostatic discharges at atmospheric pressure consist in ionizing the environment air, or a gas at atmospheric pressure nearby the surface of an inert polymeric material. Such a phenomenon promotes chemical reactions between the reactive species generated by discharge and the polymer surface. Their main advantages are the simplicity and low cost of technique execution; however, their great disadvantage is the susceptibility of the material activated when exposed to the environment, reacting with any compounds present in the atmosphere and returning to make passive the surface or, even contaminating it (R. A. Wolf, Surface activation systems for optimizing adhesion to polymers, ANTEC™ 2004, Conference Proceedings).

The low energy ion implantation technique consists in producing and accelerating ions of interest, against the polymeric surface with controlled energy. This technique is extremely sophisticated and expensive, but allows to select the ions and to control their energies. Furthermore, the technique uses an ion beam extremely collimated, reaching a reduced area to be activated, what makes the processing of great areas, difficult and slow (G. Mesyats et al., Adhesion of polytetrafluorethylene modified by an ion beam, Vacuum 52:285-289, 1999).

The third technique consists in the exposure of polymeric surface to a low temperature plasma discharge, in a reduced pressure environment. The discharge in plasma allows a reasonable control of existing active species as a function of the gases employed to generate plasma. Depending on the plasma characteristics, this technique also can be known as plasma-immersion ion implantation (A. Kondyurin et al., Attachment of horseradish peroxidase to polytetrafluorethylene (teflon) after plasma immersion ion implantation, Acta Biomaterialia 4:1218-1225, 2008). The control of pressure and reaction gases flow allows controlling the concentration of active species and, consequently, the final activation degree of the produced surface. The need for vacuum in the environment before injection of reactive gases raises the costs and makes difficult the process (P. K. Chu et al., Plasma-surface modification of biomaterials, Mater. Sci. Eng. R36:143-206, 2002).

Among the great variety of chemical techniques for superficial activation, it is highlighted those of copolymer synthesis combining polymers chemically inert and active directly. These techniques have several economic advantages as easy manufacturing inclusive for the staggering process. However, from the distinct characteristics of surface energy of the employed polymers, the active sites can migrate to the inside of the inert polymer, reducing or eliminating totally the final product activity. Such phenomenon is highlighted as a disadvantage of the process. An option for eliminating this problem consists in grafting a layer of active polymer on an inert polymer substrate. In some cases, the grafting is aided by plasma. Even solving the problem of migration of the active sites, this process implies in the increase of steps necessary for obtaining the final product, (K. Kato et al., Polymer surface with graft chains, Progress in Polymer Science 28:209-259, 2003).

Other techniques for modifying the polymeric surfaces involve also treatments with solvents, acid or basic solutions and mechanical abrasion V. I. Kestelman, Physical methods of polymer material modification, Khimiya (Moscow), 1980). Most of these techniques present certain disadvantages, as for example, the production of industrial effluents, excessive degradation of the polymer, high production costs, aggregation of undesirable aspects to the polymer properties etc.

SUMMARY OF THE INVENTION

The present invention relates to a process for production of polymeric structures with activated surfaces. The process demonstrated to be simple, fast, with a high production capacity and low operational costs. The process occurs by deposition of a polymers solution, aided by a high electric field, on a conducting liquid surface for production of particles and/or filaments with activated surface.

According to the present invention it is described a process for production of activated polymeric structures, consisting of the following steps:

(i) prepare a polymeric solution or emulsion or suspension or dispersion composed by at least one solute, and at least one solvent, and (ii) eject the polymeric solution or emulsion or suspension or dispersion through an ejector nozzle, aided by an electric field, on a liquid surface.

Thus, the present invention allows the production of particles and/or filaments with surfaces chemically activated by a sole process.

DETAILED DESCRIPTION OF THE INVENTION

The present invention relates to a simple, fast process with high production capacity and low cost for production of polymeric structures with activated surfaces. More particularly, it relates to a process that, simultaneously, is able to produce particles and/or filaments with chemically active surfaces.

The mentioned process for production of activated polymeric structures is characterized by the following steps:

(i) prepare a polymeric solution or emulsion or suspension or dispersion comprising at least one solute and at least one solvent, and (ii) eject the polymeric solution or emulsion or suspension or dispersion through an ejector nozzle, aided by an electric field, on a conducting liquid surface.

The process described in the present invention does not require special conditions, such as vacuum, which make the process expensive and more difficult. It even does not require the use of treatments with chemicals, or mechanical abrasion, which burden the process of activation of the polymeric surfaces because they increase the number of process steps, due to production of industrial effluents, and even can generate an excessive polymer degradation or aggregation of undesirable aspects to the polymer properties.

The process consists in ejecting a polymeric solution or emulsion or suspension or dispersion with the aid of a high electric field on a conducting liquid surface. The ejection process can form particles and/or filaments depending on the physicochemical characteristics of the polymeric solutions employed. Contact of the electrostatically charged particles and/or filaments with the conducting liquid surface allows the activation of the particles and/or filaments surface. Activation results from a physicochemical process which introduces functional groups in the polymeric chain exposed on the particles and/or filaments surface.

The choice of the functional group shall be carried out from the polymer chemical structure and the composition of the conducting liquid surface used, from the knowledge of an expert skilled in the state-of-the-art. Functional groups in the polymeric chain can be organic radicals or inorganic radicals with anionic or cationic nature. Preferably, but not limited to, the radicals can be derived from oxygen (O) and nitrogen (N), such as, hydroxyl (OH$^-$), carbonyl (C=O), carboxyl (COOH), aldoxyl (COH), amine (NH$_2$), amide (CONH$_2$), ammonium (NH$_4^+$). Radicals can be also ions like: bromide (Br$^-$) or fluoride (F$^-$) or other functional groups available in the state-of-the-art.

Figure 1:
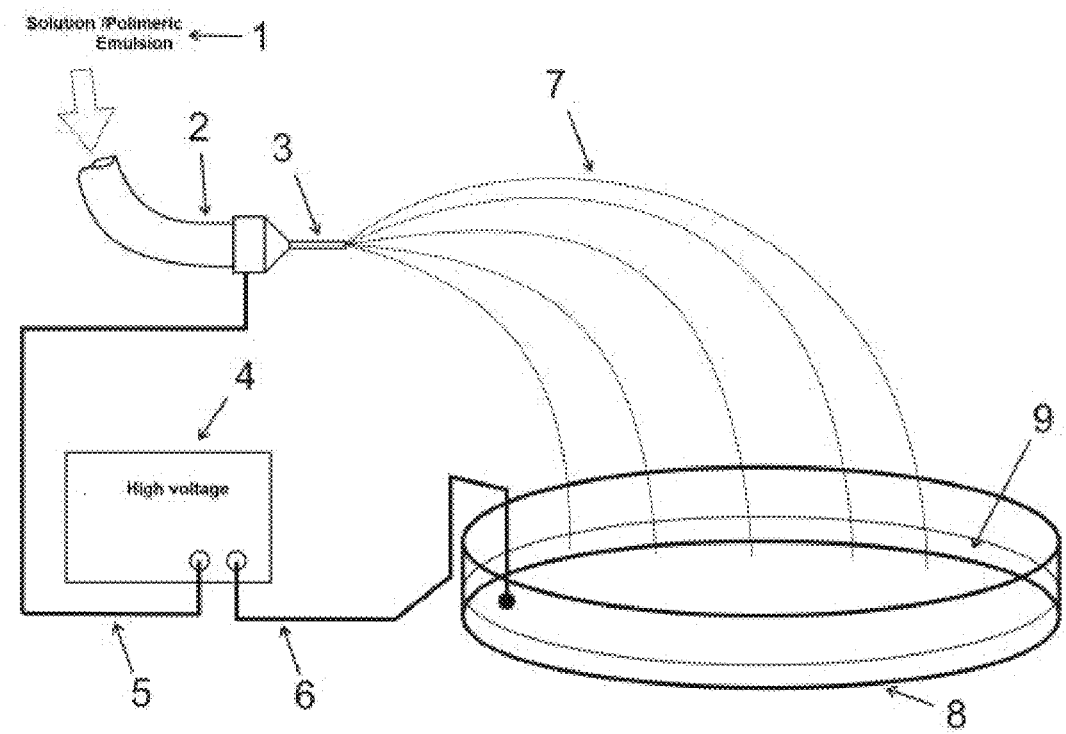
FIG. 1: The figure describes a configuration of the ejection process, which allows getting particles and/or filaments with the activated surface. In this figure the polymeric solution (1) pass through the piping (2) arriving to the capillary tube (3), which is connected to one of the poles of the high voltage source (4) by the electric conductor (5). The other pole of the high voltage source (6) is connected to the conducting liquid surface (9) contained in the container (8). The polymeric solution jets (7) ejected from the capillary tube (3) can form polymeric particles or filaments, depending on the physical properties of the polymeric solution. The particles or filaments suffer the reaction that activates their surface on the conducting liquid surface (9), where they are collected.

The process of the present invention can be performed from any apparatus allowing eject a polymeric solution or emulsion or suspension or dispersion, aided by a high electric field, on a conducting liquid surface. FIG. 1 shows one of the possible configurations to be employed for obtaining the process of the present invention, among the several existent and susceptible to be used.

In FIG. 1, it is represented the piping (2), which leads the polymeric solution or emulsion or suspension or dispersion (1), the capillary tube (3), the high voltage source (4), the conductor (5) that connects one of the source poles to the capillary tube, o conductor (6) that connects the opposite source pole to the conducting liquid surface, the particles and/or filaments ejected (7) during the process, in the collector (8) containing the conducting liquid surface (9).

The polymeric solution or emulsion or suspension or dispersion employed in the present invention should comprise at least, one solute and one solvent. The solute should comprise at least, a polymeric material. Overall, it can be used all polymers that can be modified with the purpose to introduce functional groups in the polymeric chain, which are selected from the knowledge of an expert skilled in the state-of-the-art. It can be used polymers such as polystyrene (PS), polymethylmetacrylate (PMMA), nylon, polyester, polyacrylonitrile, polyvinyl alcohol, polyurethane, polylactic acid, and/or any other polymer or copolymer compatible with the solution or emulsification or suspension or dispersion process.

The solute can contain different materials in its composition besides the polymeric material, since they are suitable to the final activity desired. These materials can be additives, surfactants and/or molecules of interest. The materials can present any mechanical, electrical, thermal, magnetic, nuclear and/or optical properties available in the state-of-the-art, important to achieve the final result expected for an expert skilled in the state-of-the-art.

The additives can be considered as substances added with the purpose of optimizing the yield of a property. Surfactants can be considered substances able to change the superficial and interfacial properties of the solution.

The solute can contain molecules of interest according to the final use of the particles or filaments, such as active ingredients or biological molecules like proteins, antigens, antibodies, DNA or RNA fragments, chemicals, active substances; or molecules with magnetic, electrical, thermal, nuclear and/or optical properties available in the state-of-the-art.

Maintenance of the solute in solution or emulsion or suspension or dispersion shall be carried out by any method known in the state-of-the-art, and can be obtained, for example, as a function of the its physicochemical properties or by external mechanical agitation.

The solvent employed can be pure, a mixture or emulsion of organic or inorganic solvents, able to dissolve or emulsify or suspend or disperse the solute. Preferably, it can be used water, alcohol, chloroform (CHL) and tetrahydrofuran (THF), toluene, dimethyl formamide (DMF), or any other solvents available in the state-of-the-art, or a mixture or emulsion thereof, at several proportions, adjusted from the knowledge of an expert skilled in the state-of-the-art.

The mixture or emulsion of solvents, when employed, can contain at least, an inorganic solvent miscible or not, as for example, water. The solvent of suspensions or dispersions should be preferably water or any solvent available in the state-of-the-art able to maintain the solute in suspension or dispersion in a suitable manner, from the knowledge of an expert skilled in the state-of-the-art.

The polymeric solution or emulsion or suspension or dispersion employed should present physicochemical properties suitable to the process, which can be adjusted as a function of the percentages of mixture or emulsion or suspension or dispersion of the solute with the several possible solvents. Physicochemical properties of the polymeric solution or emulsion or suspension or dispersion can be also adjusted as a function of concentration, temperature, pressure. All characteristics can be adjusted from the knowledge of an expert skilled in the state-of-the-art.

The polymeric solution or emulsion or suspension or dispersion employed should also present the surface tension suitable to the process, and can be adjusted as a function of the percentages of mixture or emulsion of the solute with the solvent or adding surfactants compatible with the process, available in the state-of-the-art. Choice of the surfactant depends directly on the composition of the polymeric solution or emulsion or suspension or dispersion employed, and can be adjusted from the knowledge of an expert skilled in the state-of-the-art.

The polymeric solution or emulsion or suspension or dispersion can be transported to be submitted to the process employing any pumping process available in the state-of-the-art.

The polymeric solution or emulsion or suspension or dispersion can present electrical conductivity compatible with the process, a fact that depends directly on its composition. This condition can be adjusted by an expert skilled in the state-of-the-art.

The process of the present invention is aided by a high electric field. The electric field can be continuous, pulsated or alternate or a combination thereof. The high electric field can be produced by any source available in the state-of-the-art, and should be connected directly to the capillary tube(s), or directly to the polymeric solution or emulsion.

Preferably, but not limited to it, it should be used an electric field upper than 100 V/cm until the limit of the dielectric. Voltages to be used shall preferably be above 500 V, and can be positive or negative, since they are able to produce the electric field required to the process described in the present invention. Maximum voltage to be employed should be such that the limit of disruption of the dielectric is not reached, under the conditions of the environment in which the process is carried out, from the knowledge of an expert skilled in the state-of-the-art.

The system employed in the present invention uses at least, an ejector nozzle comprising a capillary tube. The system even provides the possibility of simultaneous use of more than a capillary tube.

The capillary tube can be comprised of any material conducting or not electricity, available in the state-of-the-art. In case of the polymeric solution or emulsion or suspension or dispersion to present electrical conductivity, the capillary tube can be composed by a material not conducting electricity. Preferably, but not limited to, the capillary tube can be made of a metallic material.

The ejection process of the present invention can occur by means of any method existing in the state-of-the-art, from the knowledge of an expert skilled in the state-of-the-art. Preferably, but not limited to, the ejection process can occur by an effect of the high electric field, by an effect of compressed gas, liquid under pressure or a combination thereof. A polymeric solution or emulsion or suspension or dispersion can be ejected at cold temperatures, at room temperature or at hot temperatures, under inert controlled atmosphere, chemically active, or in the environment. These conditions shall be adjusted according to the physicochemical characteristics of the polymeric solution or emulsion or suspension or dispersion from the knowledge of an expert skilled in the state-of-the-art.

The process of the present invention is characterized by the fact that the deposition of the ejected material occurs on a conducting liquid surface contained in a collector.

A conducting liquid surface comprises a solution containing one or more constituents, responsible for the transfer of radicals from the conducting liquid surface to the polymeric structures. The solution of the conducting liquid surface will have physicochemical characteristics enabling deposition and collection of the polymeric structures in such a manner to not allow its dissolution. These physicochemical characteristics will be determined from the knowledge of an expert skilled in the state-of-the-art.

The solution of the conducting liquid surface can be composed by water, organic liquids, inorganic liquids or ionic liquids containing organic or inorganic radicals. Alternately, the solution of the liquid surface can be composed by one or more liquid ionic salts. Preferably, the liquid surface will be composed by an aqueous solution containing organic or inorganic radicals.

The conducting liquid surface also can contain soluble inorganic compounds containing transition metals that act as catalysts in the process of surface activation of the polymeric structures.

A conducting liquid surface can be of neutral, acid or basic nature, and therefore be within the pH range 1 to 14. Preferably, it will have pH upper than 7.

The solution of the conducting liquid surface can contain in its composition, the organic or inorganic radicals of anionic or cationic nature. Preferably, but not limited to, the radicals can be derived from oxygen (O) and nitrogen (N), such as hydroxyl ($OH^-$), carbonyl ($C=O$), carboxyl (COOH), aldoxyl (COH), amine ($NH_2$), amide ($CONH_2$), ammonium ($NH_4^+$). The radicals can be also ions like: bromide ($Br^-$) or fluoride ($F^-$) or other functional groups available in the state of the art. The choice of the radicals shall be carried out from the chemical structure of the polymer and the composition of the conducting liquid surface used, from the knowledge of an expert skilled in the state of the art.

In order to the conducting liquid surface to present electrical conductivity, this should be electrically connected to the opposite pole of the high voltage source aiding the process of the present invention. This assures attraction of the particles or filaments onto the conducting liquid surface. The attraction assures physical contact between the conducting liquid surface and the particles or filaments, allowing its superficial activation.

The conducting liquid surface where it occurs deposition of the particles or filaments can be static or dynamic, and can be horizontal, vertical or forming any angle related to the horizontal plan. Dynamic conducting liquid surfaces should be preferably continuous.

The process of the present invention is characterized by the fact that it produces particles, filaments or combinations of both with radicals of interest on its surface. Particles should present preferable spheroid shapes, with dimensions within the range of some nanometers to some hundreds of micrometers, presenting or not size variability.

Figure 2:
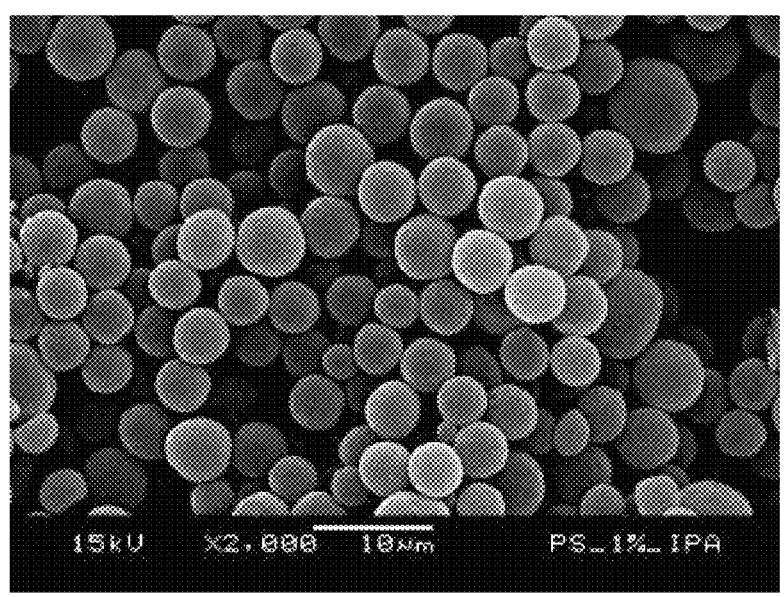
FIG. 2: Image of scanning electron microscopy of polystyrene particles by employing the method of the present invention.

Particles produced by the process of the present invention present dimensions within the range of nanometers to micrometers. For its use in diagnostic systems, the particles present preferably dimensions within the range of 50 nm to 500 ☐m. FIG. 2 presents a image of scanning electron microscopy of polystyrene (PS) particles obtained by employing the process of the present invention for example purposes. The particles generated can be selected dimensionally according to the application from the knowledge of an expert skilled in the state of the art.

Figure 4:
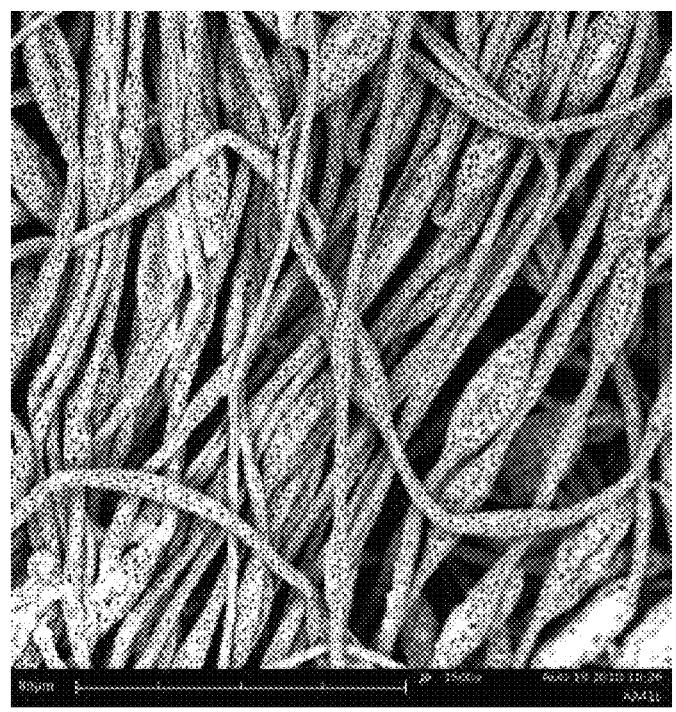
FIG. 4: Image of scanning electron microscopy of a combination of polymethylmetacrylate filaments and particles, in a bead necklace shape, obtained employing the method of the present invention.

The filaments generated can present diameters varying within the range of nanometers to micrometers, and lengths varying from micrometers to centimeters. For use in diagnostic systems, regarding the diameter, the filaments present, preferably, dimensions in the range of 10 nm to 250 ☐m. FIG. 4 presents a image of scanning electron microscopy of a combination of filaments and particles of polymethylmetacrylate (PMMA), in the shape of a bead necklace, obtained by employing the process of the present invention.

Figure 3:
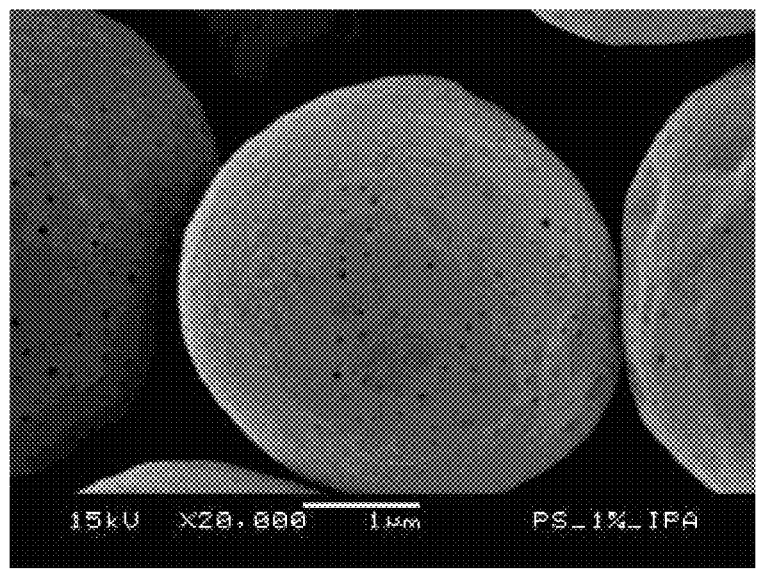
FIG. 3: Image of scanning electron microscopy of polystyrene particles by employing the method of the present invention with a greater magnification.

Due to the process characteristics, the particles and/or filaments produced can present a smooth or rough surface, and the superficial roughness presents preferably the shape of cavities or villi with dimensions varying from nanometers to some micrometers. Polystyrene particles (PS) of FIG. 2 present cavities within the range of nanometers that are visible at greater magnifications, as shows FIG. 3. The roughness increases the surface area and hence, the activated area. Preferably, the particles and/or filaments produced from the process of the present invention, present a rough surface.

Combinations of filaments and particles can present combinations of the individual characteristics, preferably forming structures similar to bead necklaces. The combination of filaments and particles of FIG. 4, produced with polymethylmetacrylate (PMMA), presents cavities easily visible with a lesser magnification, due to its great dimensions.

The process of the present invention is characterized by the fact that the activation occurs in the contact between electrostatically charged particles and/or filaments and the conducting liquid surface, and the superficial activation occurs by incorporation to the polymeric chain, of functional groups, originating from organic or inorganic radicals of interest, preferably, but not limited to, derivatives of oxygen (O) and nitrogen (N), such as, hydroxyl ($OH^-$), carbonyl ($C=O$), carboxyl (COOH), aldoxyl (COH), amine ($NH_2$), amide ($CONH_2$), ammonium ($NH_4^+$), or even, ionic radicals, such as bromide ($Br^-$), fluoride ($F^-$) or other radicals available in the state-of-the-art.

The present invention is described in detail by the examples presented below. It is necessary to stress that the invention is not limited to these examples, but also includes variations and modifications within the limits, which it can be developed.

Example 1

Production of Polymeric Structures with Activated Surface

The polymeric structures with chemically activated surface were produced from using polymers of polystyrene or polymethylmetacrylate in chloroform or tetrahydrofuran. Solutions of 0.5% to 4.0% w/v of polymer were submitted to the process described in the present invention, by effect of a high electric field at different voltages. Deposition of the polymeric structures produced, was carried out on different conducting liquid surfaces from addition of several substances, resulting in different pH values, at room temperature. Thus, it was obtained particles and/or filaments by means of different conditions described in table 1.

TABLE 1

Characteristics of the samples of polymeric structures produced and the conditions of the production process.

| Sample | Composition | Electric field | Conducting liquid surface | | Special conditions |
| | | | pH | Substance added | |
| --- | --- | --- | --- | --- | --- |
| Particles NaOH_AA75L | Polystyrene 0.5% w/v in chloroform | 6 KV | 12.5 | NaOH | not applicable |
| Particles HCl_AA76L | Polystyrene 0.5% w/v in chloroform | 7 KV | 1.0 | HCl | not applicable |
| Particles NaBr_AA77L | Polystyrene 0.5% w/v in chloroform | 7 KV | 6.7 | NaBr | not applicable |
| Particles Mag_NaBr_AA68L | Polystyrene 0.5% w/v in chloroform + $Fe_2O_3$ Nanoparticles | 5 KV | 6.7 | NaBr | not applicable |
| Particles Arcomp_NaBr_AA80L | Polystyrene 1.0% w/v in chloroform | 15 KV | 6.7 | NaBr | Atomization by compressed air |
| Filaments NaBr_AA37L | Polymethyl-metacrylate 1.0% w/v in chloroform | 9 KV | 6.7 | NaBr | not applicable |
| Particles NaBr_AA38L | Polystyrene 4.0% w/v in tetrahydro-furan | 6.5 KV | 6.7 | NaBr | not applicable |

Example 2

Evaluation of the Binding Capacity of Activated Polymeric Surfaces

Activation of the polymeric surface can be observed through the binding capacity of this surface to other materials, such as molecules of interest. For verification of the binding capacity of the polymeric surface it was used a fluorescent reporter protein as a marker of the active sites. This binding occurs only if there are radicals of the carboxyl (COOH) type on the surface. Thus, the fluorescence detection means that the polymeric surface was efficiently activated by the binding between the surface and the reporter protein.

This test was performed by employing a conventional procedure in the state-of-the-art for determining the activation degree. This consists in using monobasic sodium phosphate ($NaH_2PO_4$), N-Hydroxysulfosuccinimide (Sulfo-NHS) and 1-ethyl-3-[3-dimethylaminopropyl]carbodiimide (EDC) hydrochloride as reagents to convert carboxyl groups into amino-reactive NHS esters, here named Sulfo-NHS/EDC treatment. Thus, the surface becomes apt to bind to any aminated molecules, which can be proteins, nucleic acids, carbohydrates, fatty acids, chemical compounds, active ingredients, and other polymeric substances available in the state-of-the-art. Aiming to assure the stability of molecules and compounds above mentioned, after coupling with the polymeric surface, the particles or filaments are suspended in a phosphate buffered saline (PBS).

As a reporter protein for comparative tests of the activation and binding capacity of the polymeric surfaces, two types of distinct biological molecules were used. An antibody coupled to the fluorescent molecule Phycoerythrin (PE), with a fluorescence peak located between 560 nm and 630 nm, and GFP (Green Fluorescent Protein), with a fluorescence peak between 514 nm and 530 nm.

The activation degree of all particles was determined from the following protocol. The particles were placed in the wells in a 96-well plate with a filter of 1.2 □m in the bottom, adapted to a vacuum system for filtration; the wells were washed with 900 μl of distilled water and further with 600 μl of $NaH_2PO_4$. Then, it was added 80 μl of $NaH_2PO_4$ to each well.

The Sulfo-NHS/EDC treatment was carried out from addition of 10 μl of Sulfo-NHS (50 μg/μl in water) to the wells. Then, it was added 10 μl of EDC (50 μg/μl in water). The plate was incubated at 37° C. under agitation of 200 rpm over 20 minutes. Subsequently, the wells were washed twice with PBS.

It was added to each well, 100 μl of the reporter proteins (200 μg/ml). The plate was again incubated at 37° C., under agitation of 200 rpm, over 2 hours. After a new wash, the particles were re-suspended in 100 μl of PBS and fixed on a microscopy slide by using 2% agarose. Wells without addition of reporter proteins were used as negative control.

Figure 5:
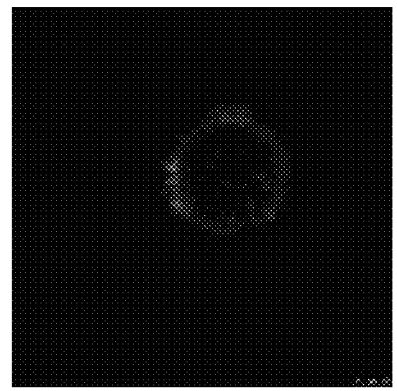
FIG. 5: Images of fluorescence obtained with the confocal microscope, without using the Sulfo-NHS/EDC treatment. (A) Commercial sample, fluorescence intensity multiplied ten times (10×); (B) sample NaBr_AA77L, fluorescence intensity multiplied five times (5×); (C) sample NaBr_AA80L, fluorescence intensity without using the multiplier (1×).
Figure 5:
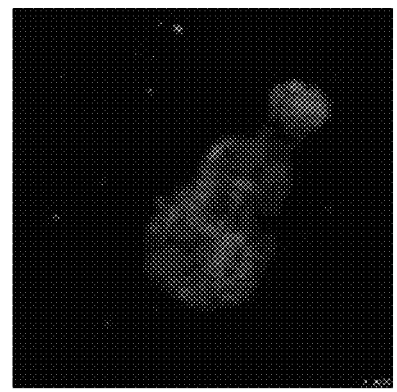
Figure 5:
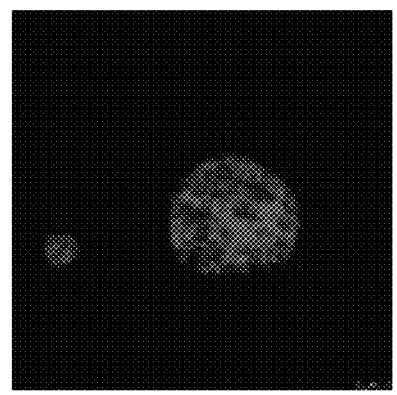
Figure 6:
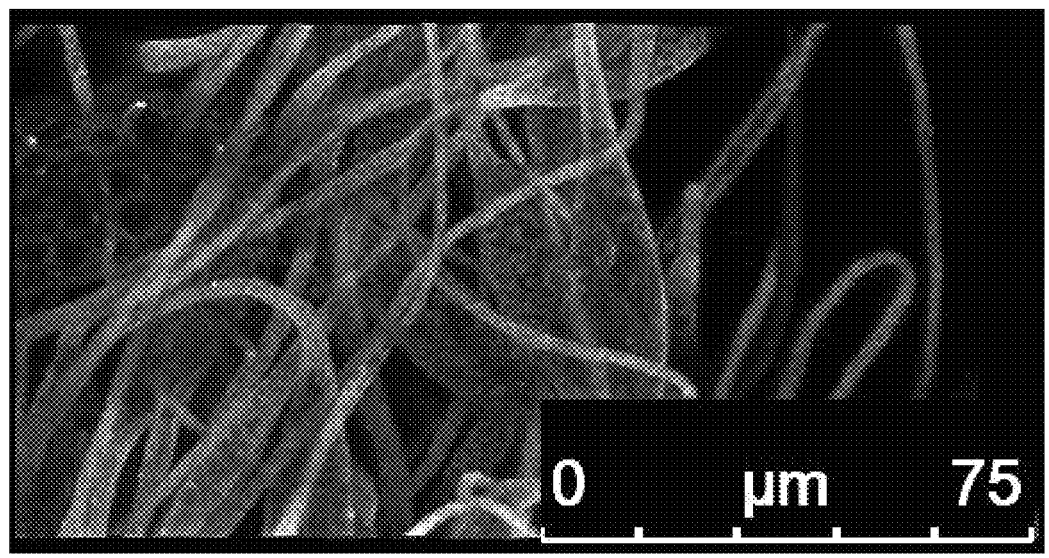
FIG. 6: Images of PE (Phycoerythrin) fluorescence obtained with the confocal microscope, without using the Sulfo-NHS/EDC treatment, of sample NaBr_AA37L.
Figure 7:
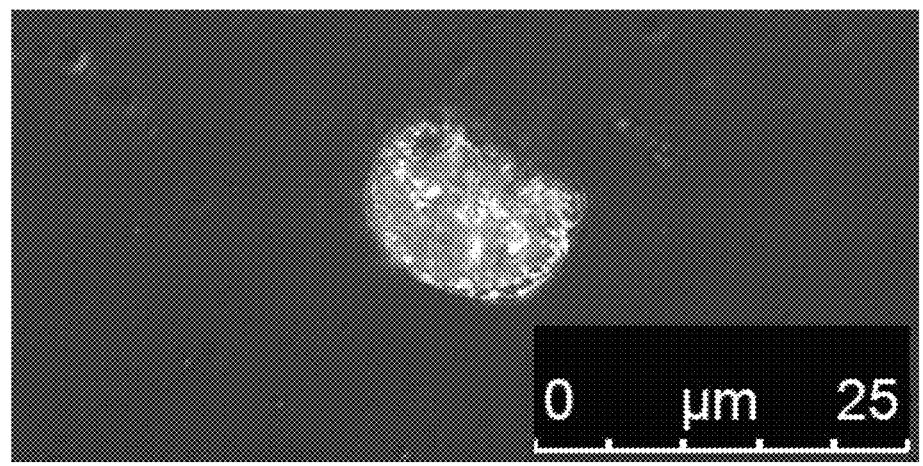
FIG. 7: Images of GFP (Green Fluorescent Protein) fluorescence obtained with the confocal microscope, without using the Sulfo-NHS/EDC treatment, of sample NaBr_AA38L.

Fluorescence detection was carried out from images obtained by confocal microscopy (FIGS. 5 to 7).

Example 3

Comparative Evaluation of the Binding Capacity of the Polymeric Surface Activated from Sulfo-NHS/EDC Treatment Binding capacity of the surface of the polymeric structures produced by employing the process described in the present invention was compared to the binding capacity or the commercial particles.

Sulfo-NHS/EDC treatment makes feasible the conversion of the carboxyl groups into NHS amino-reactive esters present on activated surfaces, making it more competent to be bound to any aminated molecule.

Table 2 presents indices that allow to analyze comparatively the fluorescence produced by each sample after binding of the fluorescent reporter protein GFP.

TABLE 2

Binding capacity of the samples submitted to Sulfo-NHS/EDC treatment from fluorescence detection

| Sample | Multiplier | AS ($\mu m^2$) | DI (UA) | DI/AS (UA/$\mu m^2$) |
|---|---|---|---|---|
| HCl_AA76L | 10 | 162.3 | 1055.7 | 0.7 |
| NaOH_AA75L | 2 | 182.8 | 3552.1 | 9.7 |
| NaBr_AA77L | 2 | 168.0 | 4662.3 | 13.9 |
| Mag_NaBr_AA68L | 2 | 126.5 | 4762.3 | 18.8 |
| Arcomp_NaBr_AA80L | 1 | 191.7 | 11420.8 | 59.6 |
| Commercial | 5 | 43.3 | 807.1 | 3.7 |

AS: area of interest selected, expressed in $\mu m^2$;
DI: integrated luminosity density: sum of the values of the pixels in the area of interest selected, expressed by arbitrary units (UA);
UA: arbitrary units;
DI/AS: index obtained by dividing the integrated luminosity density by the multiplier and further, by the area of interest, selected.

From the results presented in table 2, it is observed that all samples obtained by the process developed in the present invention, presented results superior to that obtained by the commercial sample, except for the sample HCl_AA76L. Thus, samples obtained by the process developed in the present invention, presented a greater activation degree when compared to the commercial sample activated.

For the sample NaBr_AA77L it was observed a fluorescence about three times more intense than the fluorescence from the commercial product.

For the particles Mag_NaBr_AA68L, magnetic particles due to $Fe_2O_3$ nanoparticles in its inside, it was observed a fluorescence about four times more intense than the fluorescence from the commercial product.

For the particles Arcomp_NaBr_AA80L, the process was developed from the use of compressed air. For it, the process was aided by a high electric field of about 15.0 kV. In this process, it was observed fluorescence about fifteen times more intense than the fluorescence from the commercial product.

The sample HCl_AA76L was obtained from HCl addition onto the conducting liquid surface, generating a pH 1.0. Such conditions can be responsible for the low efficiency of the binding capacity of sample HCl_AA76L, characterizing a low activation of the particles.

Example 4

Comparative Evaluation of the Binding Capacity of the Polymeric Surface Activated not Using the Sulfo-NHS/EDC Treatment Binding capacity of the surface of the polymeric structures produced by employing the process described in the present invention was evaluated not using the Sulfo-NHS/EDC treatment (FIGS. 6 and 7).

Table 3 presents indices that allow analyzing comparatively the fluorescence produced by each sample, without the Sulfo-NHS/EDC treatment, facing the commercial sample.

TABLE 3

Binding capacity of the samples, without Sulfo-NHS/EDC treatment, from the fluorescence detection

| Sample | Multiplier | AS ($\mu m^2$) | DI (UA) | DI/AS (UA/$\mu m^2$) |
|---|---|---|---|---|
| HCl_AA76L | 5 | 261.3 | 3203.9 | 2.5 |
| NaOH_AA75L | 5 | 235.4 | 3505.7 | 3.0 |

TABLE 3-continued

Binding capacity of the samples, without Sulfo-NHS/EDC treatment, from the fluorescence detection

| Sample | Multiplier | AS ($\mu m^2$) | DI (UA) | DI/AS (UA/$\mu m^2$) |
|---|---|---|---|---|
| NaBr_AA77L | 5 | 195.2 | 7512.0 | 7.7 |
| Mag_NaBr_AA68L | 3 | 152.4 | 3743.4 | 8.2 |
| Arcomp_NaBr_AA80L | 1 | 67.5 | 3488.5 | 51.7 |
| Commercial | 5 | 58.8 | 512.4 | 1.7 |

AS: area of interest selected, expressed in $\mu m^2$;
DI: integrated luminosity density: sum of the values of the pixels in the area of interest selected, expressed by arbitrary units (UA);
UA: arbitrary units;
DI/AS: index obtained by dividing the integrated luminosity density by the multiplier and, then by the area of interest, selected.

Results obtained without using the Sulfo-NHS/EDC treatment, evidence that all activated particles produced by employing the process of the present invention, present binding capacity greater than the activated commercial particles.

The use of the process described in the present invention allows obtaining highly activated particles, even without using the Sulfo-NHS/EDC treatment, such that they present indices superior to the commercial particles optimized by this treatment.

Thus, samples obtained by the process developed in the present invention, presented a greater activation degree when compared to the activated commercial sample.

In this regard, it can be exemplified with the activation indices for the particles Arcomp_NaBr_AA80L. The activation obtained by the process described in the present invention, employing ejection by compressed air, aided by high voltage, is so efficient that it remains a few sites on the surface requiring Sulfo-NHS/EDC treatment for binding optimization. For this reason, the particles Arcomp_NaBr_AA80L, submitted to Sulfo-NHS/EDC treatment, present a discrete increase of the index DI/AS.

Thus, the process described in the present invention presents the advantage to simplify the process of binding the activated particles to proteins, nucleic acids, carbohydrates, fatty acids, chemical compounds, active ingredients, and other polymeric substances, when putting aside the use of Sulfo-NHS/EDC treatment.

Example 5

Evaluation of the Activated Polymeric Surface

FIG. 5 presents the surface of the polymeric particles produced by employing the process of the present invention. It can be observed the presence of nanopores on the polymeric surfaces, which provide a greater surface area available for activation and binding of proteins, nucleic acids, carbohydrates, fatty acids, chemical compounds, active ingredients, and other polymeric substances.

Increase of the activated surface due to the nanopores, can be evidenced by observation of a fluorescence inside the particle, whereas the particle commercially obtained presents most of its fluorescence on the surface (FIG. 5).

Observation of the images of FIG. 5 allows seeing the different activation degrees obtained by employing the method of the present invention. Comparison of the images 5A, 5B and 5C presenting the commercial particle, NaBr_AA77L and Arcomp_NaBr_AA80L, respectively, allows to conclude that the process described here for particle activation appears to be more efficient and advantageous.

Example 6

Evaluation of the Polymeric Surface Activated by X-Ray Photoelectron Spectroscopy (XPS) and Fourier Transform Infrared Spectroscopy (FTIR)

Superficial activation can also be observed from X-Ray Photoelectron Spectroscopy (XPS). When employing polystyrene, the technique indicates the disappearance of double carbon bonds (C=C), associated to the benzene ring on the surface, and the simultaneous appearance of the peaks regarding the double Carbon-Oxygen (C=O) and single Carbon-Oxygen bonds (C—O).

Figure 8:
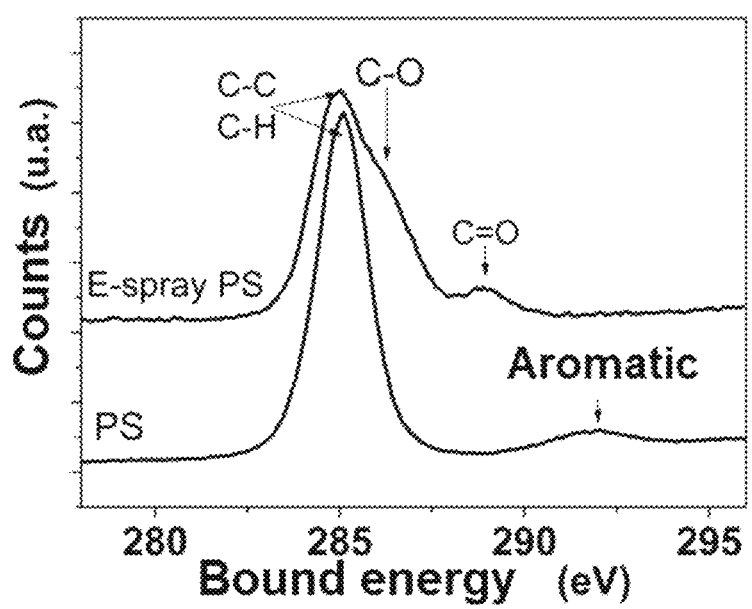
FIG. 8: Spectra of photo-emission excited by x-ray (XPS) of polystyrene submitted and not submitted to the process of the present invention.

FIG. 8 shows the photo-emission spectra of the polystyrene not submitted and therefore, not activated; and the polystyrene activated by the process described in the present invention. In the non-activated polystyrene spectrum it is visible the peak corresponding to single carbon-hydrogen (C—H) and carbon-carbon (C—C) bonds and the peak corresponding to the pi ($\pi$) bond of the aromatic ring. In the spectrum of polystyrene activated by the process described in the present invention, it is visible also the peaks corresponding to the single carbon-oxygen bond (C—O) and the double carbon-oxygen bond (C=O). The peak corresponding to the pi ($\pi$) bond of the aromatic ring disappeared, indicating the benzenic ring break on the activated polystyrene surface.

Figure 9:
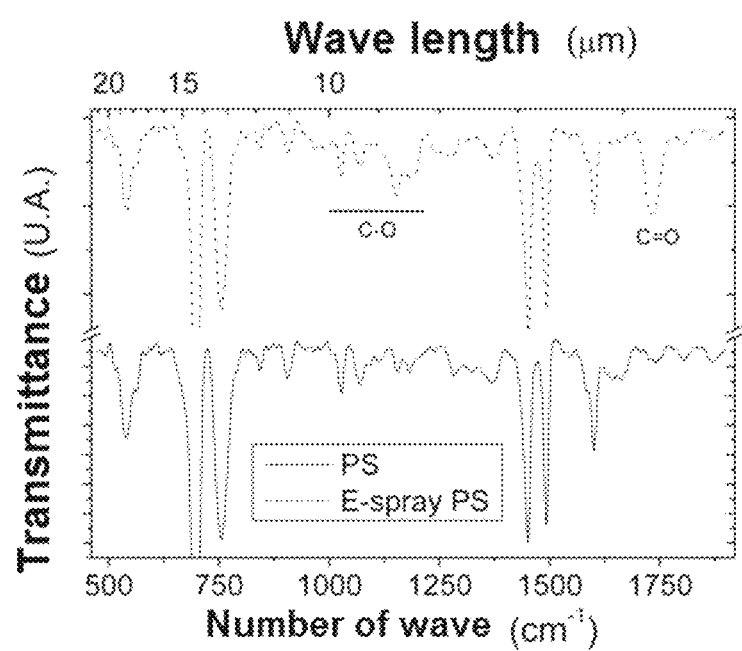
FIG. 9: Spectra obtained using Fourier Transform Infrared Spectroscopy (FTIR) of polystyrene submitted and not submitted to the process of the present invention.

The Fourier Transform Infrared Spectroscopy (FTIR) technique allows to verify the activation in polystyrene by the appearance of the band in 1733 $cm^{-1}$, which represents the axial deformation of the double Carbon-Oxygen bond (C=O), and in the region 1000-1200 $cm^{-1}$, of which bands correspond to the deformation of the single Carbon-Oxygen (C—O) bond, as evidenced in FIG. 9.

Materials obtained with the process described in the present invention have several immediate technological applications as, for example, for binding of biological molecules like proteins, antigens, antibodies, DNA or RNA fragments, chemicals, active ingredients. Making more functional the particles and/or filaments with biological molecules, allows their usage in diagnostic systems for human or animal health control, as well as for active ingredients delivery systems, in a specific manner for treatment of several diseases.

The use of nanoparticles or nanofilaments, mainly in the health technological sector, has a great action field due to increase the efficiency of active ingredients. Particles can provide a greater specificity when addressing and/or controlling the release of the active ingredient, addressing it to specific organs or cells. In case of the filaments it is possible to associate antibiotics and antiseptics, forming membranes for treatment of burns and wounds.

The present invention is described in detail through the examples presented here. However, it is necessary to stress that the invention is not limited to these examples, but also includes variations and modifications within the limits in which it works.

The invention claimed is:

1. A process for producing activated polymeric structures, comprising the following steps:
   (i) preparing a polymeric composition comprising a fluid medium and at least one component in the fluid medium, wherein the polymeric composition is a solution or an emulsion or a suspension or a dispersion,
(ii) ejecting the polymeric composition through an ejector nozzle, aided by an electric field, and
(iii) depositing on a liquid surface the polymeric composition ejected through the ejector nozzle, wherein the liquid surface is: (a) contained in a collector; (b) electrically conductive; and (c) electrically connected to a voltage source to attract the polymeric composition ejected through the ejector nozzle so as to produce during the depositing step activated polymeric structures in the collector, which are particles and/or filaments having activated surfaces with binding capacities.

2. The process according to claim 1, wherein the activated polymeric structures are suitable to be used in diagnostic systems.

3. The process according to claim 1, wherein the at least one component of the polymeric composition is at least one of polystyrene and polymethylmetacrylate.

4. The process according to claim 1, wherein the at least one component of the polymeric composition comprises at least one of an additive, a surfactant and a molecule having selected biological, magnetic, electrical, thermal, nuclear and/or optical properties.

5. The process according to claim 1, wherein before the ejecting step, physicochemical properties of the polymeric composition are adjusted or the polymeric composition is mechanically agitated to maintain the at least one component of the polymeric composition in solution or emulsion or suspension or dispersion.

6. The process according to claim 1, wherein the fluid medium comprises at least one solvent.

7. The process according to claim 1, wherein the polymeric composition is electrically conductive or is not electrically conductive.

8. The process according to claim 1, wherein the fluid medium comprises at least one liquid selected from the group consisting of chloroform, tetrahydrofuran and water.

9. The process according to claim 1, wherein the polymeric composition presents physical properties suitable to the process, which are adjusted as a function of concentration, temperature, pressure, as well as addition of surfactants.

10. The process according to claim 1, wherein the electric field has a strength of more than 100 V/cm and is provided by electrically connecting a first electrode of the voltage source to the nozzle and a second electrode of the voltage source to the liquid surface.

11. The process according to claim 1, wherein the process is carried out under an inert controlled atmosphere, a chemically active atmosphere or at room temperature.

12. The process according to claim 1, wherein the ejector nozzle comprises at least one metallic capillary pipe connected to an electrode of the voltage source.

13. The process according to claim 1, wherein the liquid surface is static or dynamic.

14. The process according to claim 1, wherein the liquid surface is arranged horizontally, vertically or forming any angle relative to a horizontal plane.

15. The process according to claim 1, wherein the liquid surface comprises a solution containing one or more solvents and ionic radicals of interest for activation of the polymeric structures.

16. The process according to claim 1, wherein the liquid surface comprises one or more liquid ionic salts and/or comprises one or more soluble inorganic compounds containing transition metals.

17. The process according to claim 1, wherein the liquid surface has an alkaline nature.

18. The process according to claim 1, wherein the activated surfaces of the polymeric structures comprise at least one functional group selected from the group consisting of hydroxyl ($OH^-$), carbonyl ($C=O$), carboxyl (COOH), amine ($NH_2$), amide ($CONH_2$), aldoxyl (COH), ammonium ($NH_4^+$), bromide ($Br^-$) and fluoride ($F^-$).

19. The process according to claim 1, wherein the activated polymeric structures are produced through contact between the liquid surface and electrostatically charged particles and/or filaments.

20. The process according to claim 1, wherein at least one functional group selected from the group consisting of hydroxyl ($OH^-$), carbonyl ($C=O$), carboxyl (COOH), amine ($NH_2$), amide ($CONH_2$), aldoxyl (COH), ammonium ($NH_4^+$), bromide ($Br^-$) and fluoride ($F^-$) is incorporated along a polymeric chain.

21. The process according to claim 20, wherein the activated polymeric structures are spheroid shaped particles with dimensions in a range of nanometers to hundreds of micrometers, and can present or not present a dimensional dispersion.

22. The process according to claim 20, wherein the activated polymeric structures are filaments with diameters in a range of nanometers to micrometers and lengths in a range of micrometers to meters.

* * * * *